United States Patent
Lachner

[15] 3,643,829
[45] Feb. 22, 1972

[54] PRESSURE-RESISTANT PLASTICS BOTTLE

[72] Inventor: Otto Lachner, Kempten, Allgau, Germany

[73] Assignee: Lever Brothers Company, New York, N.Y.

[22] Filed: Aug. 22, 1969

[21] Appl. No.: 852,315

[52] U.S. Cl............................................215/1 C, D9/135
[51] Int. Cl.........................................................B65d 1/02
[58] Field of Search..................D9/100, 118, 135, 145, 158, D9/169; 215/1.5

[56] References Cited

UNITED STATES PATENTS

| 3,043,461 | 7/1962 | Glassco | 215/1.5 |
| 3,343,579 | 9/1967 | Clark | 215/1.5 X |
| 3,511,401 | 5/1970 | Lachner | 215/1.5 |
| D217,847 | 6/1970 | Jenkins | D9/1 |

Primary Examiner—Donald F. Norton
Attorney—Louis F. Kline, Jr., Melvin H. Kurtz and Edgar E. Ruff

[57] ABSTRACT

A blow-molded plastics bottle for carbonated drinks has a shoulder region, above a cylindrical main part, of height 0.5 to 0.6 of the bottle height and formed with an externally convex curvature, the radius of the curvature of which progressively decreases from less than infinity adjacent the main part to a value lying between 0.5 D and 2 D where D is the diameter of the main part. Between the shoulder and a cylindrical neck of the bottle is an externally concave curve of maximum radius 6 millimeters.

5 Claims, 1 Drawing Figure

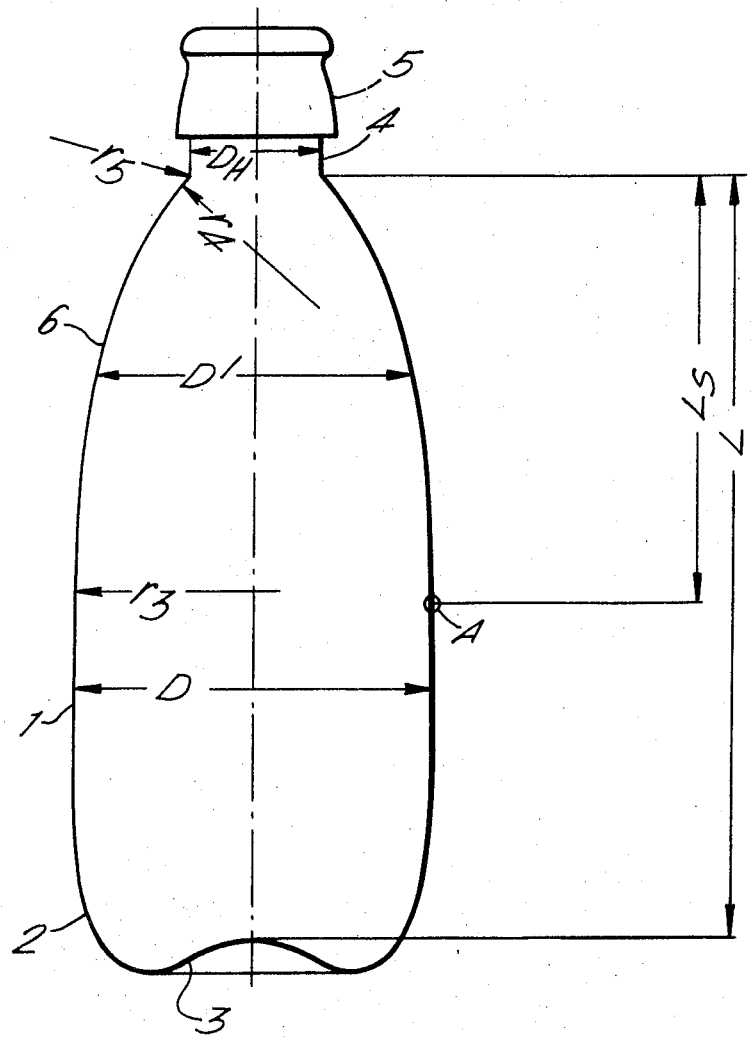
INVENTOR
OTTO LACHNER

PRESSURE-RESISTANT PLASTICS BOTTLE

The invention relates to a blow-molded pressure-resistant plastics bottle, preferably of polyvinyl chloride, and especially for carbonated drinks.

We have a previous patent application which relates to a pressure-resistant plastics bottle in which the zone of transition from a cylindrical main part of the bottle to the base is shaped in a particular way. Bottles made in this shape can withstand considerably higher internal pressure at the bottom than all other previously known shapes of bottles. It was found, however, that there was a limit to the extent to which this resistance to relatively high pressure in the bottle could be made use of, in that the bottle burst under test at the transition zone from the cylindrical main part to the bottle neck, particularly from the cylindrical main part to the bottle shoulder.

The aim of the invention is, therefore, also to improve the pressure-resistance of a plastics bottle in the shoulder region.

Known bottles, and particularly plastics bottles, have a shoulder region defined by an externally convex curve adjoining the top of a cylindrical main part of the bottle and running into an externally concave curve that merges into a cylindrical neck. The radius of the concave curve is often larger than that of the convex curve. There are also bottles, however in which the radius of the convex curve is greater than the radius of the cylindrical part of the bottle and the radius of the concave transition curve to the neck is relatively small compared to the radius of the convex curve. In all these bottles the point of transition of the cylindrical main part into the convex curve of the shoulder region is to a greater or lesser extent above the center of the height of the bottle.

It has been found, however, that in all known bottles the walls are thinner near the point of transition of the cylindrical main part into the shoulder region than they are in the cylindrical part, which is the cause of weakness near this point.

The invention takes its point of departure from the prior art in that an extruded tubular plastics preform which is gripped at points near each end is blown in a mold, the stretching of the preform taking place in such a way that it first touches the mold walls at a contact point lying about midway between the two grip points.

We have observed that at all points where the preform is already in contact with the mold walls it can no longer stretch in an axial direction and it is now proposed to so select the curvature of the bottle shoulder region, and of course the corresponding parts of the mold, that the free length of the preform, between the point at which its neck end is clamped and its point of first contact with the mold walls, should remain free as long as possible during further blowing so that it stretches uniformly to form the shoulder region of the bottle when it does finally contact the mold walls. This is achieved by keeping the radius of an externally concave transition curve between an externally convex should region and the bottle neck very small, whereas the radius of curvature of the convex shoulder region is relatively large and begins at or near to the point where a tubular preform first touches the mold walls when being blown.

An ideal tubular preform would have the same wall thickness and temperature all the way along its length, and in the blown bottle the radius of the convex transition curve of the shoulder region could then join the cylindrical main part precisely half way between the grip points of the neck and base of the bottle. However, plastics bottles, particularly PVC bottles, are usually manufactured by the extrusion blow-molding process which involves extruding a tubular preform vertically downwards and subsequently blow-molding it with the aid of a forming mandrel introduced into the mold from the top. If no wall thickness control is used the tubular extruded preform tends to stretch as a result of its own weight, the thickness of the walls decreasing towards the top and the preform cooling down so that it falls short of the ideal. For this reason the exact point where the blown preform first comes into contact with the mold walls may vary from being exactly midway between the two grip points and can be further from the neck end than the exact midway point.

According to the present invention a plastics bottle made by blow-molding an extruded tubular preform has a cylindrical main body part, a shoulder region with a wholly externally convex curvature forming a transition zone adjacent the cylindrical part, and an externally concavely curved second transition zone between the shoulder region and a cylindrical bottle neck, the height of the transition zone forming the shoulder region being 0.5 L to 0.6 L where L is the height of the bottle between spaced points at which the bottle was gripped by the mold near each end, the external convex curvature of the shoulder region being somewhat in the form of an ellipse and its radius of curvature $r_3$ being less than infinity adjacent the cylindrical main part and changing by decreasing progressively towards the second transition zone, to a value lying between 0.5 D and 2 D where D is the external diameter of the cylindrical main part, the externally concave second transition zone having a maximum radius of curvature $r_5$ of 6 millimeters. This provides that during the blow-molding step there is a free length of the tubular preform, in the shoulder region, which is as large as possible for as long a time as possible before it contacts the mold walls.

Preferably the radius of curvature $r_3$ of the shoulder region decreases to a value lying between D and 2 D.

Preferably the radius of curvature of the second transition zone lies between 0.5 and 3 millimeters.

The radius of curvature $r_3$ of the shoulder region, at a portion thereof immediately adjacent the second transition zone, may decrease to a radius of value $r_4$ which is smaller than that of the next adjacent portion of the shoulder region. The radius of value $r_4$ may be between one-fourth D and a value less than 2 D, preferably between one-third D, and D.

The invention is described by way of example with the aid of the accompanying diagrammatic drawing, which shows an axially symmetrical bottle.

The bottle consists of the cylindrical main part 1, the transition zone 2 to the base 3, the cylindrical neck 4, and the mouth 5. The shoulder 6 is formed by a transition zone according to the invention between the cylindrical main part 1 and the cylindrical neck 4.

The tubular preform is gripped during the blowing process at the base 3 and the cylindrical neck 4. The distance between these two points where the preform is gripped is L. In the cylindrical main part 1 the bottle has a diameter D. In the region of the shoulder 6 the diameter D' decreases towards the top. The neck 4 of the bottle has the diameter $D_H$.

The length of the shoulder region, which forms the transition zone from the cylindrical main part 1 to the grip point of the neck 4, is marked $L_S$ and its length is 0.5 L to 0.6 L. At the transition point A an externally convex curve adjoins the cylindrical main part, being somewhat in the form of an ellipse and having a radius of curvature $r^3$ which is less than infinity adjacent the cylindrical main part and changes by decreasing progressively to a value between 0.5 D and 2 D, and towards a second transition zone consisting of an externally concave curve of radius $r_5$ of maximum value 6 millimeters, preferably between 0.5 and 3 millimeters.

The radius of curvature $r_3$ of the shoulder region, at a portion thereof immediately adjacent the second transition zone ($r_5$), can decrease to a smaller radius $r_4$ of value lying between one-fourth D and a value less than 2 D, preferably between one-third D and D.

This wholly externally convex curvature of the bottle shoulder region and the extent of the height of the shoulder region, together with the values of the radius of curvature, provides that when a tubular preform is being blown in a mold having the contours of the finished bottle, the portion of the preform which eventually forms the bottle shoulder region has maximum freedom from contact with the mold wall, and thus is free to stretch uniformly in the lengthwise direction, being as large in length as is possible for as long a time as possible before the shoulder region of the preform contacts the mold wall substantially simultaneously over its whole area.

During blowing the tubular preform contacts the mold walls firstly near the cylindrical neck at the second transition zone, and then is expanded radially with but little lengthwise stretch until it settles on the walls at about transition point A. Further preform expansion is both radial and lengthwise in the shoulder region, and with a high degree of uniformity which ensures uniformity of bottle wall thickness in the shoulder region.

Thus the form of the externally convexly curved transition between the cylindrical main part of the bottle and the neck contributes towards the manufacture of pressure-resistant plastics bottles which are strong and require a low weight of material.

What is claimed is:

1. A plastics bottle made by blow-molding an extruded tubular preform, and molded to have a cylindrical main body part, a shoulder region with a wholly externally convex curvature forming a transition zone adjacent the cylindrical part, and an externally concavely curved second transition zone between the shoulder region and a cylindrical bottle neck, the height of the transition zone which forms the shoulder region being 0.5 L to 0.6 L where L is the height of the bottle between spaced points at which the bottle is gripped by the mold near each end, the external convex curvature of the shoulder region being generally in the form of an ellipse and having a radius of curvature $r_3$ which is less than infinity adjacent the cylindrical main part and changes by decreasing progressively towards the second transition zone to a value lying between 0.5 D and 2 D where D is the external diameter of the cylindrical main part, the externally concave second transition zone having a maximum radius of curvature $r_5$ of 6 millimeters.

2. A plastics bottle according to claim 1, wherein the radius of curvature $r_3$ of the shoulder region decreases to a value lying between D and 2 D.

3. A plastics bottle according to claim 2, wherein the radius of curvature $r_5$ of the second transition zone lies between 0.5 and 3 millimeters.

4. A plastics bottle made by blow-molding an extruded tubular preform, and molded to have a cylindrical main body part, a shoulder region with a wholly externally convex curvature forming a transition zone adjacent the cylindrical part, and an externally concavely curved second transition zone between the shoulder region and a cylindrical bottle neck, the height of the transition zone which forms the shoulder region being 0.5 L to 0.6 L where L is the height of the bottle between spaced points at which the bottle is gripped by the mold near each end, the external convex curvature of the shoulder region being generally in the form of an ellipse and having a radius of curvature $r_3$ which is less than infinity adjacent the cylindrical main part and changes by decreasing progressively towards the second transition zone to a value $r_4$ lying between one-fourth D and 2 D where D is the external diameter of the cylindrical main part, the externally concave second transition zone having a maximum radius of curvature $r_5$ of 6 millimeters.

5. A plastics bottle according to claim 4, wherein the radius of value $r_4$ is between one-third D and D.

* * * * *